United States Patent [19]
Jin et al.

[11] Patent Number: 5,905,215
[45] Date of Patent: May 18, 1999

[54] ABSOLUTE POSITION DETECTION METHOD FOR STROKE SENSING CYLINDER

[75] Inventors: Young Il Jin; Jin Han Lee, both of Changwon, Rep. of Korea

[73] Assignee: Volvo Construction Equipment Korea Co., Ltd, Rep. of Korea

[21] Appl. No.: 08/999,295

[22] Filed: Dec. 29, 1997

[30] Foreign Application Priority Data

Mar. 25, 1997 [KR] Rep. of Korea ............... P97-10356
Jul. 31, 1997 [KR] Rep. of Korea ............... P97-36745
Jul. 31, 1997 [KR] Rep. of Korea ............... P97-36748
Sep. 27, 1997 [KR] Rep. of Korea ............... P97-49429

[51] Int. Cl.$^6$ .................................................. G01M 15/00
[52] U.S. Cl. .......................................... 73/865.9; 73/116
[58] Field of Search ..................... 73/866.5, 865.9, 73/116, 117.2, 117.3, 118.1; 123/419, 436; 701/110, 111

[56] References Cited

U.S. PATENT DOCUMENTS

| | | | |
|---|---|---|---|
| 5,018,384 | 5/1991 | Hayashi et al. | 73/866.5 |
| 5,070,726 | 12/1991 | Fukui et al. | 73/116 |
| 5,070,727 | 12/1991 | Davis et al. | 73/116 |
| 5,079,945 | 1/1992 | Hansen et al. | 73/116 |
| 5,433,108 | 7/1995 | Sawada | 73/117.3 |
| 5,717,133 | 2/1998 | Wu et al. | 123/419 |

*Primary Examiner*—George Dombroske
*Attorney, Agent, or Firm*—Harness, Dickey & Pierce, P.L.C.

[57] ABSTRACT

A method for detecting the direction and displacement of a rod member of a hydraulic cylinder assembly is provided. The hydraulic cylinder assembly includes a plurality of magnetic sensors for outputting a magnetic field variation signal disposed adjacent a hydraulic cylinder. The plurality of magnetic sensors cooperate with a plurality of magnetic projections equally spaced along a rod member for producing the magnetic field variation signal. The signal is converted from a sine wave into a square wave by using a microprocessor. The edges of the converted square wave are counted to accurately detect a direction and displacement amount. The method further includes the steps of ignoring a square wave edge caused by disturbance, if the square wave edge occurs prior to a pre-set time, wherein the pre-set time is based on the average time interval for previous edges. The method further includes the step of generating a correction edge when no edge is detected during the pre-set time interval. The method still further includes the step of detecting successive correction edges for determining an absolute position of the hydraulic stroke.

7 Claims, 8 Drawing Sheets

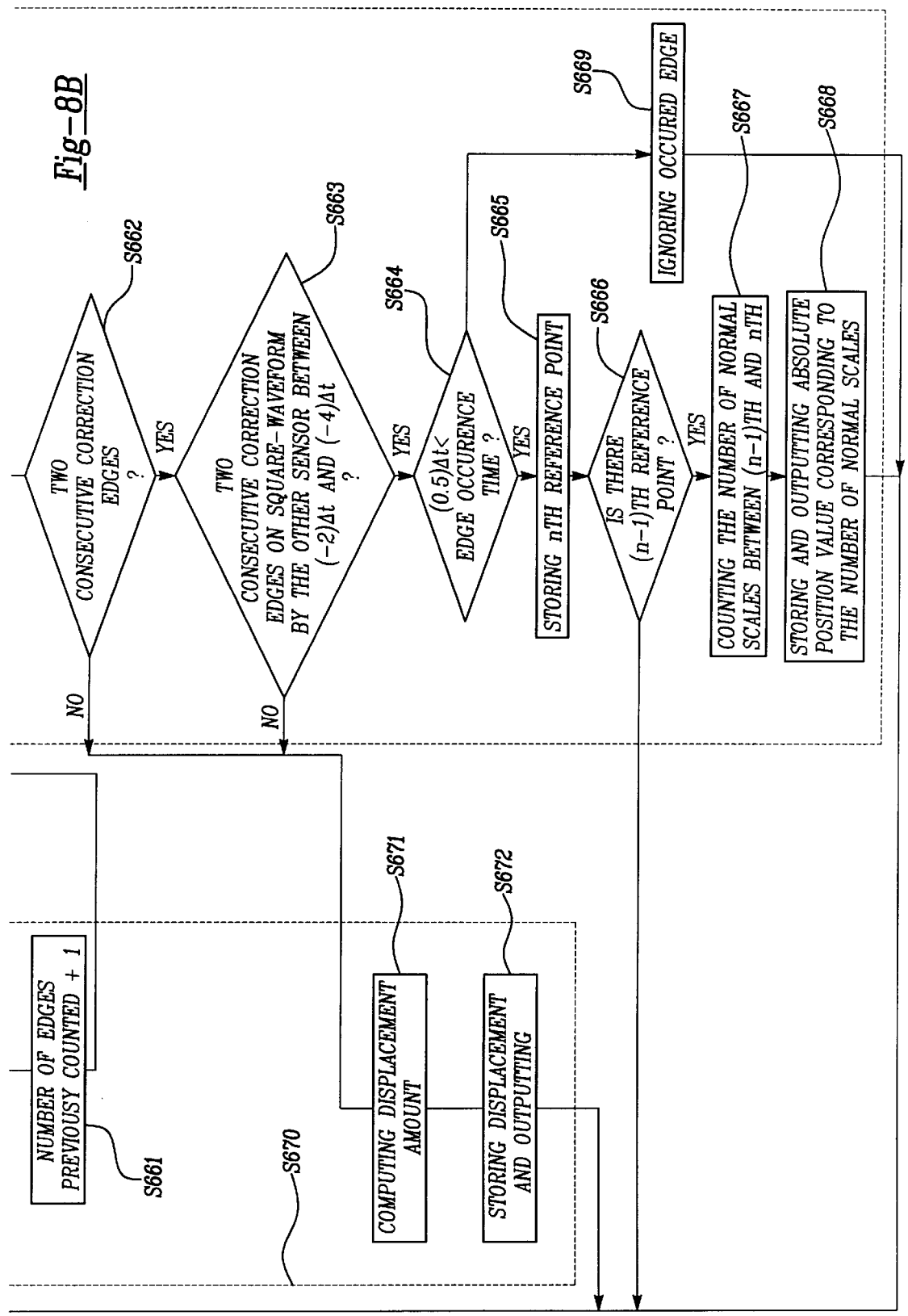

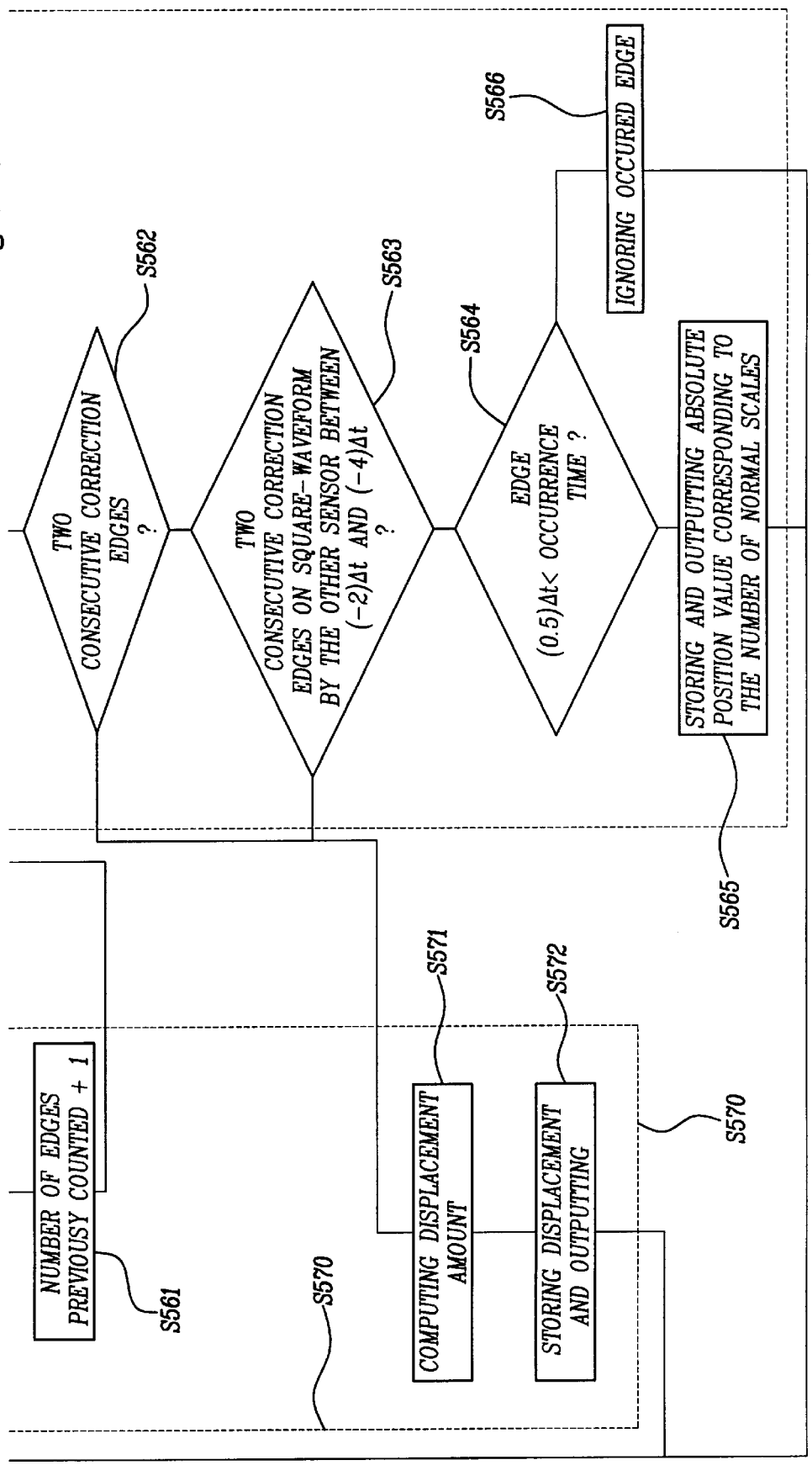

ABSOLUTE POSITION DETECTION METHOD FOR STROKE SENSING CYLINDER

BACKGROUND OF THE INVENTION

1. Field of the Invention

The present invention relates to a method for detecting the stroke position of a cylinder and, more particularly to an improved method of detecting the stroke position of a cylinder, wherein the method is capable of detecting the absolute position and direction movement of the rod member.

2. Description of the Prior Art

Generally, construction equipment, such as excavators, have a hydraulic cylinder for driving a working apparatus, such as a boom, an arm, or a bucket. Upon receiving a control command from an operator, pressurized fluid is supplied into the cylinder or discharged to a storing tank, thereby driving the working apparatus.

Due to automation of construction equipment control systems, detection of information relating to position of the working apparatus becomes increasingly important.

As a means for detecting the displacement of the working apparatus, conventional methods have employed a cylinder, as shown in FIG. 1, and a displacement detection circuit, as shown in FIG. 2.

FIG. 1. is a schematic view illustrating a conventional stroke sensing cylinder. As shown in this figure, a piston 120 is disposed within a cylinder 110. Piston 120 is movable either vertically or horizontally depending upon the specific application. A rod member 130 is integrally formed with piston 120 to support movement thereof. Rod member 130 includes a plurality of magnetic scales or projections 140. Each of the plurality of magnetic projections 140 are equally spaced and formed between the top dead point and the bottom dead point of the piston 120. A magnetic sensor 150 is provided for cooperating with the plurality of magnetic projections 140. The magnetic sensor 150 detects magnetic field variation caused by movement of the plurality of magnetic projections 140.

In operation, the piston 120 moves forward and backward between the top dead point and the bottom dead point within the cylinder 110, thereby similarly displacing rod member 130. Movement of the plurality of magnetic projections 140 formed on the rod member 130 is detected by the magnetic sensor 150. The magnetic sensor 150 then outputs a sine wave representing movement of the rod member 130. The sine wave is then converted into a square wave in order to calculate the displacement of piston 120.

In other words, as the piston 120 moves, a magnetic field variation is detected by the magnetic sensor 150 and converted into a square wave. The number of edges of the square wave can be determined and the displacement of the piston 120 can be calculated.

FIG. 2 is a block diagram illustrating a displacement detection circuit for a hydraulic cylinder. The circuit includes a magnetic sensor and a microprocessor. As shown in this figure, when an actuating signal is directed to a cylinder driving unit 210, an output signal of the cylinder driving unit 210 actuates a cylinder 220. The cylinder 220 includes a plurality of magnetic projections and causes the magnetic sensor to output a sine wave representative of the magnetic field variation. The sine wave is applied to a microprocessor 240. The microprocessor 240 receives necessary information from an inner memory unit or an additional memory unit 250, and/or stores information that it has processed in the inner memory unit.

In operation, an operator inputs a driving signal into the cylinder driving unit 210, thereby actuating the cylinder 220. A pair of magnetic sensors 231, such as hall-effect sensors, within the magnetic sensor unit 230 detect a magnetic field variation in the plurality of magnetic projections (see reference numeral 140 in FIG. 1). More particularly, the pair of magnetic sensors 231 output a sine wave representative of the magnetic field variation. The sine wave is then directed to the signal processing unit 232.

The signal processing unit 232 amplifies and filters the sine wave outputted from the magnetic sensors 231. The signal processing unit 232 then converts the sine wave into signals which are recognizable by the microprocessor 240 and outputs them to the microprocessor 240.

The microprocessor 240 converts the sine wave signal inputted from the signal processing unit 232 into a square wave. The microprocessor 240 then counts the number of pulses or edges and computes the displacement and the direction of motion of the cylinder. The microprocessor then stores the value at a memory unit 250 and outputs the results to a predetermined display unit (not shown).

The two magnetic sensors 231 are orientated such that they have a phase difference of 90°. A phase difference of 90° enables the magnetic sensors 231 to detect direction and displacement of the rod member 130.

However, due to problems in manufacturing, it is difficult to accurately place the magnetic sensors 231 to achieve the proper 90° phase difference. Furthermore, due to external variations such as shake or impact, the sine wave itself frequently fails to achieve the 90° phase difference.

As best seen in FIG. 3, ideal waveforms having the 90° phase difference are shown. Specifically, FIG. 3A shows a cross section of the plurality of magnetic projections being equally spaced along the rod member of the piston. FIGS. 3B and 3C shown output sine wave forms of the magnetic sensors A and B with the aforementioned 90° phase difference. FIGS. 3D and 3E show square waveforms corresponding to the sine waveform shown in FIGS. 3B and 3C.

However in a practical application, at least one magnetic projection edge may not be detected as shown in FIG. 4 or a single projection edge may produce a signal fluctuation as shown in FIG. 5.

More particularly, FIG. 4 is a waveform diagram showing a magnetic projection edge not being detected, while FIG. 5 is a waveform diagram showing multiple signal detections for a single magnetic projection edge. FIGS. 4A and 5A, similar to FIG. 3, show a cross section of the plurality of magnetic projections being equally spaced along the rod member of the piston. FIGS. 4B, 5B, 4C, and 5C respectively show output sine waveforms of the magnetic sensors A and B. FIGS. 4D, 5D, 4E, and 5E respectively show square wave forms corresponding to the aforementioned output sine waveforms.

It should be appreciated that the conventional method described above may not afford accurate calculation of rod displacement or direction.

SUMMARY OF THE INVENTION

An object of the present invention is to provide a method for detecting the direction and displacement of a hydraulic cylinder that overcomes the aforementioned problems encountered in the conventional art.

Another object of the present invention is to provide a detection method for a hydraulic cylinder which is capable of correcting an erroneous output waveform having a phase difference greater than 90°, and capable of assigning reference positions in order to accurately detect rod displacement and direction.

To achieve the above objects, a method for detecting the direction and displacement of a rod member of a hydraulic cylinder assembly is provided. The hydraulic cylinder assembly includes a plurality of magnetic sensors for outputting a magnetic field variation signal disposed adjacent a hydraulic cylinder. The plurality of magnetic sensors cooperate with a plurality of magnetic projections equally spaced along a rod member for producing the magnetic field variation signal. The signal is converted from a sine wave into a square wave by using a microprocessor. The edges of the converted square wave are counted to accurately detect a direction and displacement amount. The method further includes the steps of ignoring a square wave edge caused by disturbance, if the square wave edge occurs prior to a pre-set time, wherein the pre-set time is based on the average time interval for previous edges. The method further includes the step of generating a correction edge when no edge is detected during the pre-set time interval. The method still further includes the step of detecting successive correction edges for determining an absolute position of the hydraulic stroke.

Additional advantages, objects, and other features of the invention will be set forth in part in the description which follows and in part will become apparent to those having ordinary skill in the art upon examination of the following or may be learned from practice of the invention. The object and advantages of the invention may be realized and attained as particularly pointed out n the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A preferred embodiment of the present invention will now be described in detail with reference to the accompanying drawings.

Figure 6:
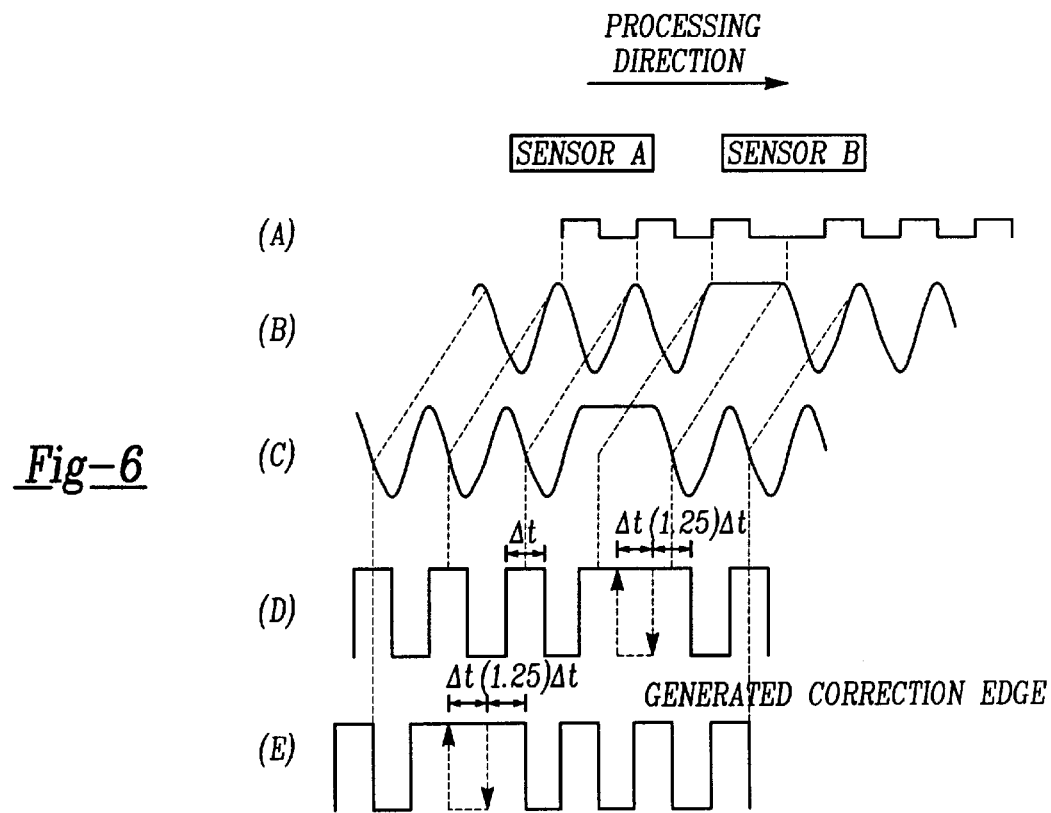
FIG. 6 is a series of waveform diagrams illustrating when the plurality of magnetic projections are not equally spaced.

FIG. 6 is a series of waveform diagrams illustrating when the plurality of magnetic projections are not equally spaced. FIG. 6A shows a plurality of magnetic projections are arbitrarily positioned along the piston rod. FIG. 6B and FIG. 6C are output sine waveforms of a pair of magnetic sensors A and B showing that the cycle of the sine waveform is extended at the portion of the magnetic projections which has been irregularly processed. The square wave form shown in FIGS. 6D and 6E illustrates the extended flat portions produced when converting the above irregular sine waveforms shown in FIG. 6B and FIG. 6C.

Figure 7A:
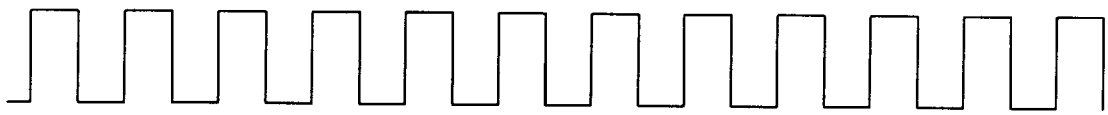
FIG. 7A is a schematic view illustrating the plurality of magnetic projections being processed in a predetermined equal interval in the conventional art.
Figure 7B:
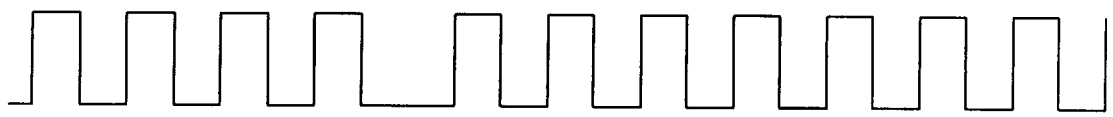
FIG. 7B is a schematic view illustrating the plurality of magnetic projections not being processed in an equal interval.
Figure 7C:
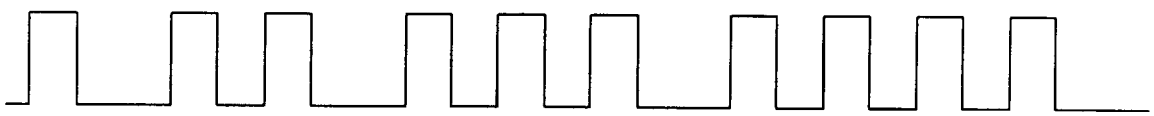
FIG. 7C is a schematic view illustrating the plurality of magnetic projections being irregularly processed according to the present invention.

As best seen in FIG. 7, the plurality of magnetic projections may be either equally spaced (FIG. 7A), out of phase (FIG. 7B), or irregularly processed (FIG. 7C).

Figure 8A:
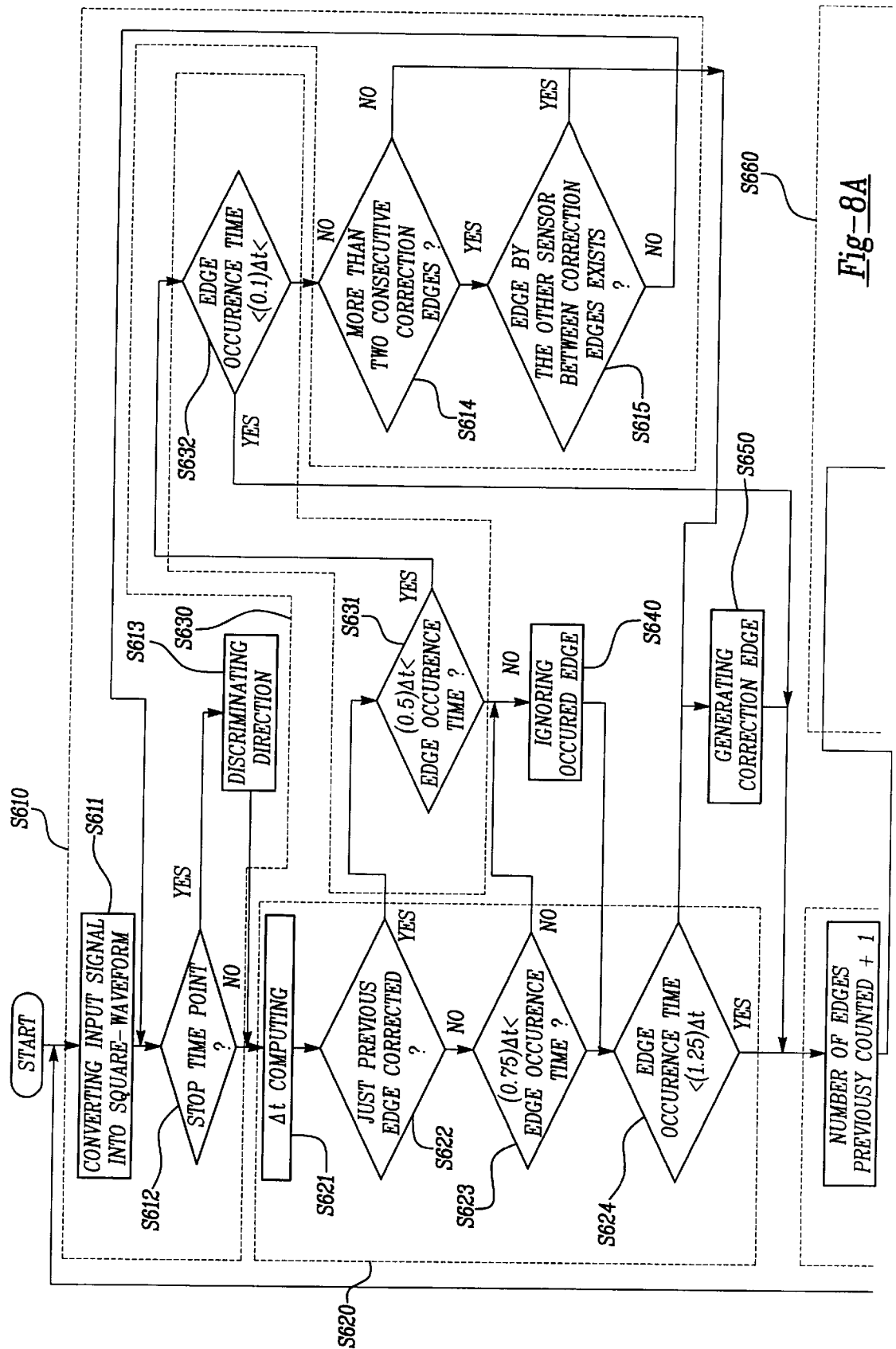
FIG. 8 is a flowchart of an absolute positioned detection method of a hydraulic cylinder showing a first embodiment of the present invention.

Referring now to FIG. 8, an absolute position detection method for detecting the direction and displacement of a rod member of a hydraulic cylinder assembly is provided. The hydraulic cylinder assembly includes a plurality of magnetic sensors disposed adjacent a hydraulic cylinder. The hydraulic cylinder assembly includes a plurality of magnetic projections preferably regularly spaced along one side of the rod member. The plurality of magnetic sensors cooperates with the plurality of magnetic projections to produce a magnetic field variation signal representative of the movement of the rod member. Accordingly, rod displacement and direction can be detected.

The absolute position detection method includes (a) a rod stop/nonstop judging step S610 judging whether the rod member has moved. The rod stop/nonstop judging step employs a microprocessor for analyzing the signal outputted from the plurality of magnetic sensors. A first edge occurrence judging step S620 is then provided for judging whether a projection edge has been detected within a first time interval. Similarly, a second edge occurrence judging step S630 is provided for judging whether the projection edge has been detected within a second time interval. An occurred edge ignoring step S640 is then employed for ignoring a projection edge when the projection edge is detected before the first time interval and the second time interval. Such detection of projection edges prior to the first time interval and the second time interval is typically due to disturbances, such as shock and impact, which may occur during operation of the construction equipment. A correction edge generating step S650 is also provided for generating a correction edge when no projection edge is detected within the first time interval and the second time interval. An absolute position establishing step S660 is then provided for storing an absolute position corresponding to a total number of counted edges. The total number of counted edges equals the sum of the projection edges and the correction edges that are detected. The absolute position establishing step outputs the absolute position to a display unit. Lastly, a displacement computing step S670 is provided for calculating the rod displacement amount according to the total number of counted edges. The displacement computing step S670 stores the rod displacement and outputs the rod displacement to the display unit. The displacement computing step S670 then returns to the rod stop/nonstop judging step S610.

The rod stop/nonstop judging step S610 includes steps S611 and S612 for judging whether the rod member is stopped or in motion. Such motion is determined by the existence of a square wave form produced in response to the magnetic field variation signal. Steps S614 and S615 are provided for judging whether the rod member is stopped or in motion depending on the existence of two consecutive correction edges. If two consecutive correction edges are detected by both magnetic sensors, then the circuit returns to the time point stopping step S612. If the time point has been stopped, then a discriminating direction step S613 is provided for determining the direction of movement just prior to the piston rod stopping. Such direction discrimination is based upon the judging of the results of steps S614 and S615.

The first edge occurrence judging step S620 includes a step S621 for determining an average time interval (hereinafter referred to as '$\Delta t$'), wherein the average time interval '$\Delta t$' is the average time interval of previous edges. A step S622 is then provided for judging whether the edge, which occurred prior to the current edge, is a normally detected edge or a correction edge. Steps S623 and S624 then judge whether the detected edge is within a predetermined time interval. The predetermined time interval is defined as a predetermined percentage of the referenced average time interval '$\Delta t$.'

Since the speed of the hydraulic cylinder varies, the time intervals between previously detected edges may be averaged to produce the referenced average time interval '$\Delta t$.' Therefore, the time at which the next detected edge should occur may be estimated. Moreover, by estimating when the next edge should occur, only those edges which do occur within a predetermined time interval are counted so as to provide an accurate displacement amount. In this embodiment, the predetermined time interval is determined by $(0.75)\Delta t \sim (1.25)\Delta t$.

In the second edge occurrence judging step S630, the time interval provided to determine whether an edge is detected is larger than the time interval used in the first edge occurrence judging step S620. By allowing the time interval used in the second edge occurrence judging step S630 to be larger than the time interval used in the first edge occurrence judging step S620, the accumulation of displacement error can be minimized. In other words, if the edge prior to the present edge was a correction edge, then the present edge may not occur within the first time interval used in the first edge occurrence judging step S620. For this purpose, an acceptable time interval in this embodiment is determined by $(0.5)\Delta t \sim (1.0)\Delta t$.

The absolute position establishing step S660 includes steps S661 and S662 for judging whether the previous two counted edges are correction edges. A step S663 is provided for judging whether at least two consecutive correction edges are detected by a second magnetic sensor. A step S665 is then provided for storing an $n^{th}$ reference point which is the time at which an edge is detected (S664) after a predetermined time has passed. If two consecutive correction edges do not occur, the absolute position establishing step S660 will then proceed to the displacement computing step S670. Step S666 is provided for first determining if there is a $(n-1)^{th}$ reference point and then counting the total number of magnetic projections that are detected between reference points $(n-1)^{th}$ and $n^{th}$. If there is no $(n-1)^{th}$ reference point, then the absolute position establishing step S660 will return to the rod stop/nonstop judging step S610. In the alternative, step 667 is provided for counting the number of magnetic projections between $(n-1)^{th}$ and $n^{th}$. Lastly, a step S668 is provided for storing and displacing the absolute position value corresponding to the number of magnetic projections. The absolute position establishing step S660 then returns to the rod stop/nonstop judging step S610.

The displacement computing step S670 includes a step S671 for computing the displacement amount of the rod member according to the total number of counted edges. The displacement computing step S670 further stores (S672) the computed displacement at a memory unit and outputs the value to a display unit. Subsequently, the displacement computing step S670 then returns to the rod stop/nonstop judging step S610.

Figure 1A:
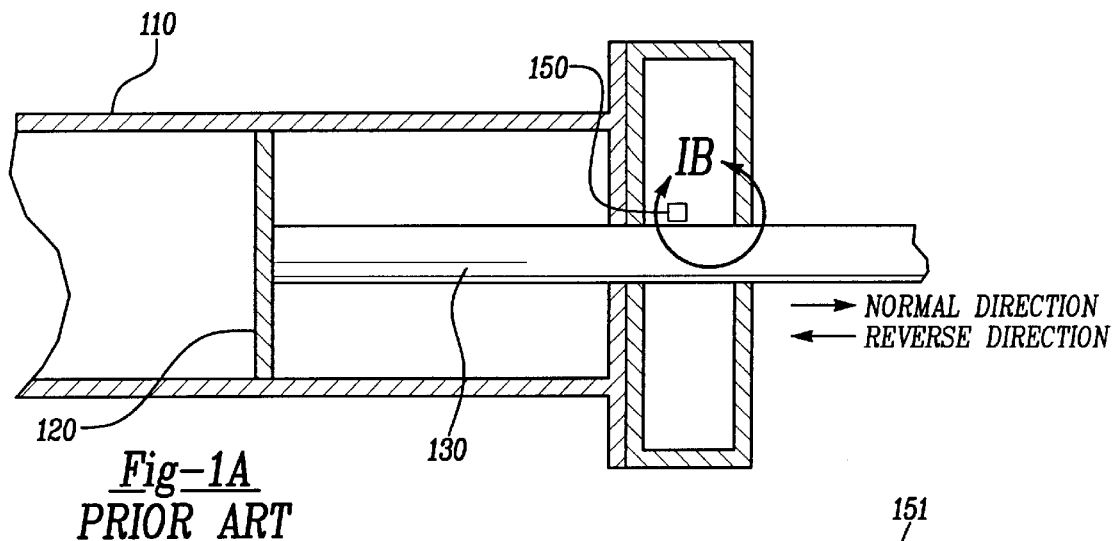
FIG. 1 is a schematic view of a stroke sensing cylinder in the conventional art.
Figure 1B:
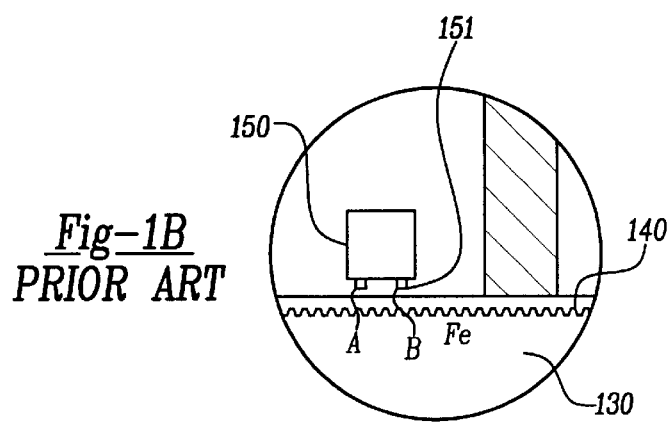
Figure 2:
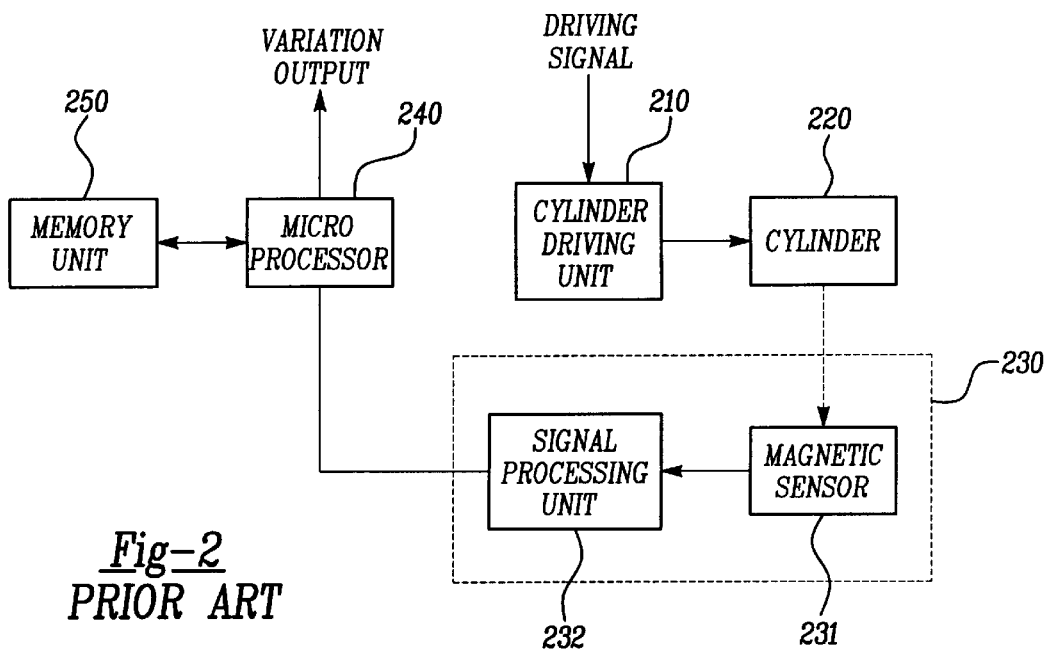
FIG. 2 is a schematic block diagram illustrating a displacement detection circuit of a cylinder corresponding to one embodiment of the conventional art.
Figure 3:
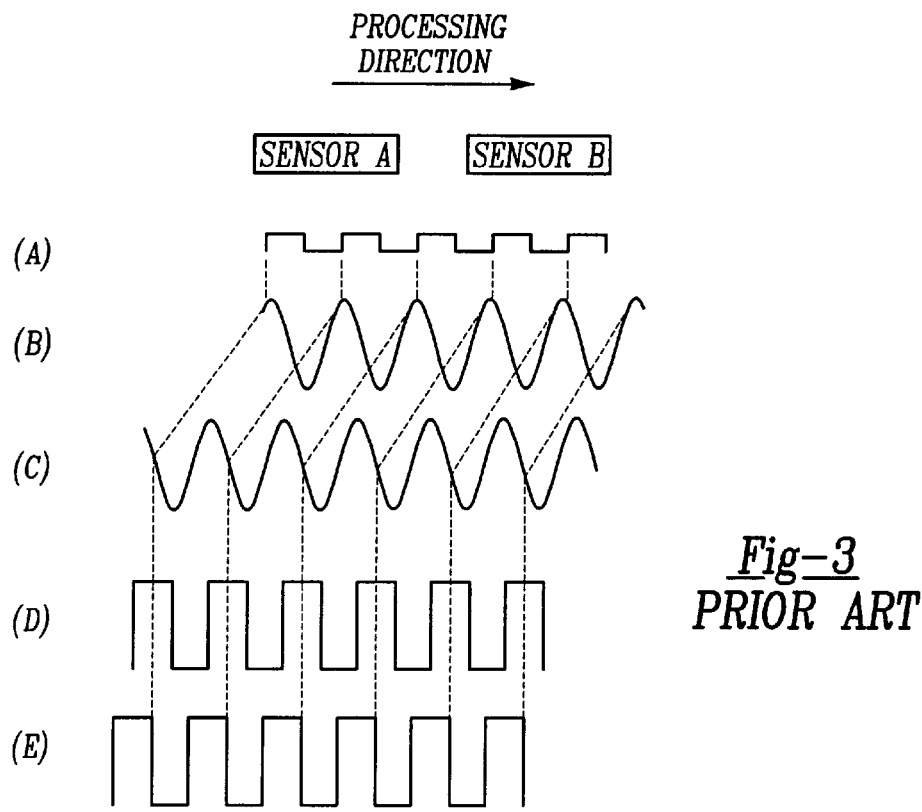
FIG. 3 is a series of waveform diagrams illustrating an ideal detection signal corresponding to a plurality of magnetic projections in the conventional art.
Figure 4:
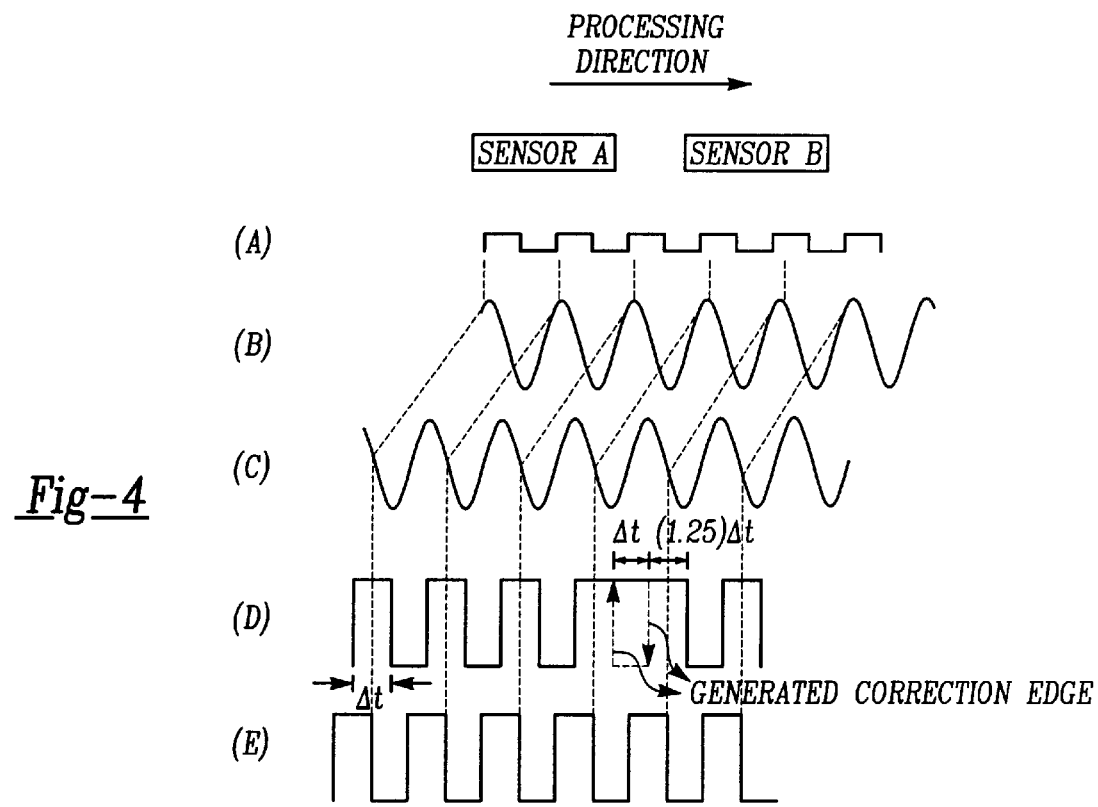
FIG. 4 is a series of waveform diagrams illustrating a magnetic projection edge failing to be detected.
Figure 5:
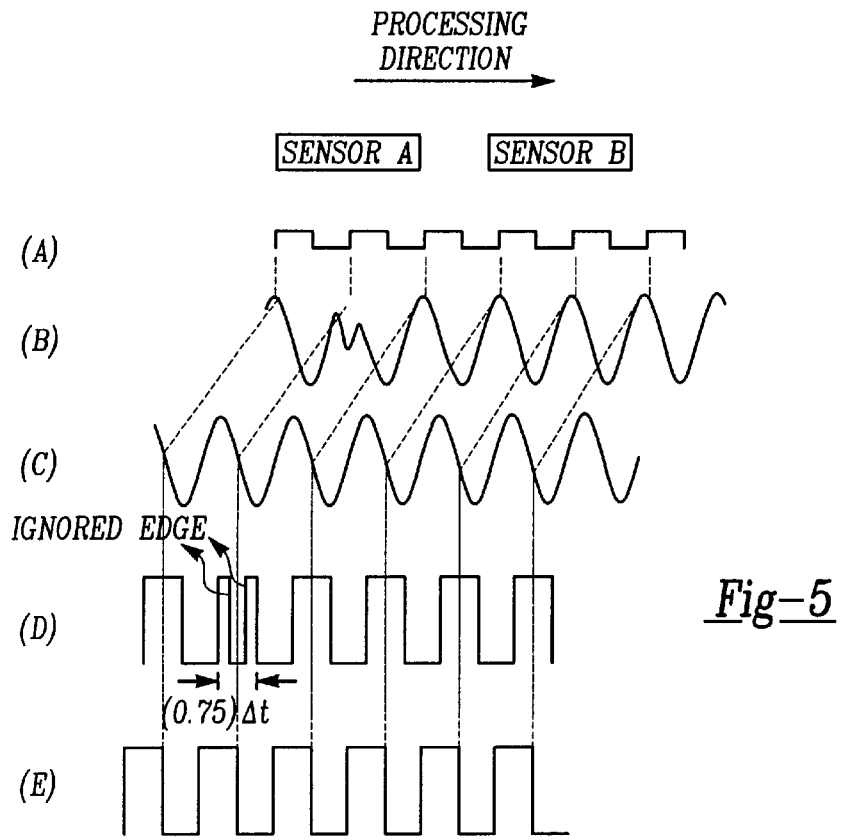
FIG. 5 is a series of waveform diagrams illustrating an erroneous detection of multiple magnetic projection edges.

Referring now to FIGS. 4–6, the operation of the absolute detection method of the present invention will now be described in detail.

As described above, FIG. 4 is a series of waveform diagrams illustrating a magnetic projection edge failing to be detected. In other words, FIG. 4, illustrates the case where displacement error is introduced when a magnetic projection edge has failed to be detected. Such failure to detect a magnetic projection edge may be due to several causes, such as shock and impact. Although a magnetic projection edge should be detected (S623) (S624) between $(0.75)\Delta t$ and $(1.25)\Delta t$, a correction edge is forcibly generated (S660) as shown in dotted lines at the time point $(1.25)\Delta t$. The next edge should be detected between $(0.5)\Delta t$ and $(1.0)\Delta t$ (S631) (S632). In this respect, the displacement error can be prevented from accumulating by setting time interval as $(0.5)\Delta t \sim (1.0)\Delta t$.

FIG. 5 is a series of waveform diagrams illustrating an erroneous detection of multiple magnetic projection edges. In other words, FIG. 5 illustrates the case when displacement error is introduced by the sensors erroneously detecting multiple projection edges. In this case, when the detected edge occurs prior to $(0.75)\Delta t$ it is ignored (S650). It is assumed that since the edge was not detected within the predetermined time interval, the detected edge must be the result of disturbance.

FIG. 6 is a series of waveform diagrams illustrating when the plurality of magnetic projections are not equally spaced. As described above, an edge is presumed to be detected between $(0.75)\Delta t$ and $(1.25)\Delta t$. However, if the actual edge of the magnetic projection was not formed properly, an edge will not be detected. Accordingly, a correction edge is generated (S660) as shown in dotted lines at the time point $(1.25)\Delta t$. The next edge should then occur between $(0.5)\Delta t$ and $(1.0)\Delta t$ (S631)(S632). In this respect, the displacement error is prevented from accumulating by setting this time interval to $(0.5)\Delta t$ and $(1.0)\Delta t$.

In the meantime, the occurrence of consecutive correction edges may signify that the rod has stopped. In this respect, it is first confirmed (S615) that an edge has been detected by the other sensor between $-(0.75)\Delta t$ and $-(1.25)\Delta t$. If the edge that was detected by the other sensor is determined to be in actual magnetic projection edge, then the detected edge is added to the number of counted edges. Alternatively, if the edge that was detected by the other sensor is considered to be a correction edge, the counting of detected edges is stopped and the direction discrimination step (S613) is performed.

However, in the case where two correction edges are consecutively detected by the first sensor (S662) and two correction edges are consecutively detected by the other sensor between $-(2)\Delta t$ and $-(4)\Delta t$, when an actual edge is detected (S664) after $(0.5)\Delta t$ has passed, this time point is stored (S665) as $n^{th}$ reference point. If a $(n-1)^{th}$ reference point (S666) exists, then the number of actual magnetic projections is counted between the $(n-1)^{th}$ and $n^{th}$ reference points. The corresponding absolute position value is then stored and outputted to a display unit. The operation then returns to the rod stop/nonstop judging step S610. If a magnetic projection edge is detected before $(0.5)\Delta t$ is passed (S664), this detected edge is ignored by treating the detected edge as an erroneously occurred edge. The operation is then returned (S669) to the rod stop/nonstop judging step (S610).

Referring now to FIG. 7C, the plurality of magnetic projections are shown not being processed in an equal interval and further having multiple irregularities. As can be appreciated, the cycles of the waveform generated by the microprocessor vary depending on each corresponding portion of the plurality of magnetic projections, Accordingly, correction edges will be generated for each of the irregular portions. An absolute position can be assigned by counting the number of magnetic projections detected and storing a reference point corresponding to the current position in the memory unit. More specifically, when a $n^{th}$ reference point is detected, it is determined whether a $(n-1)^{th}$ reference point exists. If no $(n-1)^{th}$ reference point exists, only the information relating to the $n^{th}$ reference point is stored. Alternatively, if a $(n-1)^{th}$ reference point exists, the number of magnetic projections that occur between the $(n-1)^{th}$ and $n^{th}$ reference points is counted. In this respect, by counting the number of magnetic projections between the respective points and assigning an absolute position corresponding thereto, an absolute position can be assigned from the point after two reference points are detected.

Additionally, at the point where more than three reference points are detected it is possible to confirm that the plurality of magnetic projections are normally extended or reduced, so that reliability of data can be highly improved.

Figure 9A:
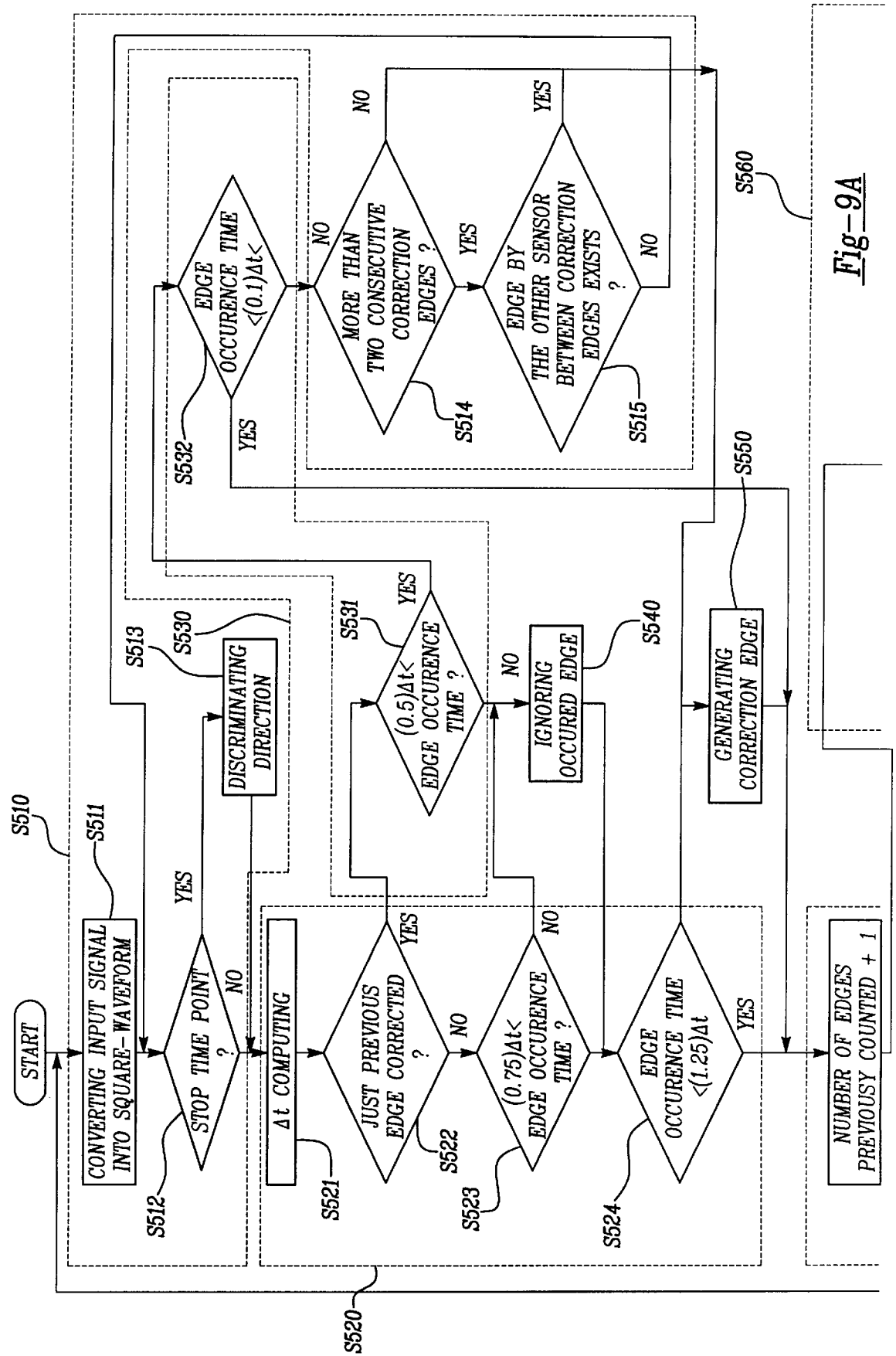
FIG. 9 is a flowchart of an absolute positioned detection method of a hydraulic cylinder showing a second embodiment of the present invention.

Referring now to FIG. 9, an absolute position detection method for detecting the direction and displacement of a rod member of a hydraulic cylinder assembly is provided. The hydraulic cylinder assembly includes a plurality of magnetic sensors disposed adjacent a hydraulic cylinder. The hydraulic cylinder assembly includes a plurality of magnetic projections preferably regularly spaced along one side of the rod member. The plurality of magnetic sensors cooperates with the plurality of magnetic projections to produce a magnetic field variation signal representative of the movement of the rod member. Accordingly, rod displacement and direction can be detected.

The absolute position detection method includes (a) a rod stop/nonstop judging step S510 judging whether the rod member has moved. The rod stop/nonstop judging step employs a microprocessor for analyzing the signal outputted from the plurality of magnetic sensors. A first edge occurrence judging step S520 is then provided for judging whether a projection edge has been detected within a first time interval. Similarly, a second edge occurrence judging step S530 is provided for judging whether the projection edge has been detected within a second time interval. An occurred edge ignoring step S540 is then employed for ignoring a projection edge when the projection edge is detected before the first time interval and the second time interval. Such detection of projection edges prior to the first time interval and the second time interval is typically due to disturbances, such as shock and impact, which may occur during operation of the construction equipment. A correction edge generating step S550 is also provided for generating a correction edge when no projection edge is detected within the first time interval and the second time interval. A reference point position establishing step S560 is then provided for storing a predetermined value as a reference point position for the current position of the piston rod. The predetermined value is stored at a memory unity when a plurality of consecutively occurring correction edges occur for both a first and second sensor within a predetermined time. Lastly, a displacement computing step S570 is provided for calculating the rod displacement amount according to the total number of counted edges. The displacement computing step S570 stores the rod displacement and outputs the rod displacement to the display unit. The displacement computing step S570 then returns to the rod stop/nonstop judging step S510.

The rod stop/nonstop judging step S510 includes steps S511 and S512 for judging whether the rod member is stopped or in motion. Such motion is determined by the existence of a square wave form produced in response to the magnetic field variation signal. Steps S514 and S515 are provided for judging whether the rod member is stopped or in motion depending on the existence of two consecutive correction edges. If two consecutive correction edges are detected by both magnetic sensors, then the circuit returns to the time point stopping step S512. If the time point has been stopped, then a discriminating direction step S513 is provided for determining the direction of movement just prior to the piston rod stopping. Such direction discrimination is based upon the judging of the results of steps S514 and S515.

The first edge occurrence judging step S520 includes a step S521 for determining an average time interval (hereinafter referred to as '$\Delta t$') step S522 is provided for judging whether the edge occurred prior to the current edge detected is a normally occurred edge or a correction edge. Steps S523 and S524 then judge whether the occurred edge is within a predetermined time. The predetermined time is defined as a predetermined percentage of the referenced time interval '$\Delta t$.'

Since the speed of the hydraulic cylinder varies, the various time intervals between adjacent edges that were previously measured may be averaged to produce the referenced time interval '$\Delta t$.' Therefore, the time at which the next occurred edge may be estimated. Moreover, by estimating when the next edge should occur, only those edges which do occur within a predetermined time interval may be counted so as to provide an accurate displacement amount. In this embodiment, the predetermined time interval is determined by $(0.75)\Delta t \sim (1.25)\Delta t$.

In the second edge occurrence judging step S530, the time interval provided to determine whether an edge occurs is larger than the time interval used in the first edge occurrence judging step S520. By allowing the time interval used in the second edge occurrence judging step S530 to be larger than the time interval used in the first edge occurrence judging step S520, the accumulation of displacement error can be minimized. In other words, if the edge prior to the current edge was a correction edge, then the current edge may not occur within the first time interval used in the first edge occurrence judging step S520. For this purpose, an acceptable time interval in this embodiment is determined by $(0.55)\Delta t \sim (1.0)\Delta t$.

The reference point position establishing step S560 includes steps S561 and S562 for judging whether the previous two counted edges are correction edges. A step S563 is provided for judging whether at least two consecutive correction edges are detected by a second magnetic sensor. A step S565 is then provided for storing a predetermined value as a reference point position over the current position of the piston rod. The step S565 then returns to the rod stop/nonstop judging step S510. A step S566 is provided for ignoring an edge when the edge occurs (S564) before the predetermined time is past. The step S566 then returns to the to rod stop/nonstop judging step S510.

The displacement computing step S570 includes a step S571 for computing the displacement amount of the rod member according to the total number of counted edges. The displacement computing step S570 further stores (S572) the computed displacement at a memory unit and outputs the value to a display unit. Subsequently, the displacement computing step S570 then returns to the rod stop/nonstop judging step S510.

FIG. 6 is a series of waveform diagrams illustrating when the plurality of magnetic projections are not equally spaced. As described above, an edge is presumed to be detected between (0.75)Δt and (1.25)Δt. However, if the actual edge of the magnetic projection was not formed properly, an edge will not be detected. Accordingly, a correction edge is generated (S560) as shown in dotted lines at the time point (1.25)Δt. The next edge should then occur between (0.5)Δt and (1.0)Δt (S531)(S532). In this respect, the displacement error is prevented from accumulating by setting this time interval to (0.5)Δt and (1.0)Δt.

In the meantime, the occurrence of consecutive correction edges may signify that the rod has stopped. In this respect, it is first confirmed (S515) that an edge has been detected by the other sensor between −(0.75)Δt and −(1.25)Δt. If the edge that was detected by the other sensor is determined to be in actual magnetic projection edge, then the detected edge is added to the number of counted edges. Alternatively, if the edge that was detected by the other sensor is considered to be a correction edge, the counting of detected edges is stopped and the direction discrimination step (S513) is performed.

However, in the case where two correction edges are consecutively detected by the first sensor (S562) and two correction edges are consecutively detected by the other sensor between −(2)Δt and −(4)Δt, when an actual edge is detected (S564) after (0.5)Δt has passed, a pre-set value is stored as a reference point position for the present position of the rod member.

If another edge is detected (S564) before the (0.5)Δt is passed, the edge is ignored and the process is returned to the rod stop/nonstop judging step S510.

According to the second embodiment of the present invention, when more than one magnetic projection are irregularly spaced thereby causing consecutive correction edges to be detected by both sensors, then the existing displacement value is substituted with a predetermined reference value. This predetermined reference value is then used to determine the absolute positions of the rod member.

Although the preferred embodiments of the present invention have been disclosed for illustrative purposes, those skilled in the art will appreciate that various modifications, additions and substitutions are possible, without departing from the scope and spirit of the invention as recited in the accompanying claims.

We claim:

1. A method for detecting the direction and displacement of a rod member of a hydraulic cylinder assembly, said hydraulic cylinder assembly having a plurality of magnetic projections extending along said rod member and a plurality of magnetic projections, said plurality of magnetic projections cooperating with said magnetic sensors to output a magnetic field variation signal in response to detection of one of said plurality of magnetic projections, said method comprising:

a rod stop/nonstop judging step for judging whether the rod member has moved, said rod stop/nonstop judging step employing a microprocessor for analyzing the magnetic field variation signal;

a first edge occurrence judging step judging whether a projection edge of one of said plurality of magnetic projections has been detected within a first time interval;

a second edge occurrence judging step judging whether said projection edge has been detected within a second time interval;

an occurred edge ignoring step ignoring said projection edge when said projection edge is detected before said first time interval and said second time interval;

a correction edge generating step generating a correction edge when said projection edge has not been detected within said first time interval and said second time interval;

an absolute position establishing step storing an absolute position corresponding to a total number of counted edges, said total number of counted edges equaling the sum of said projection edges detected and said correction edges generated; said absolute position establishing step outputting said absolute position to a display unit; and a displacement computing step calculating the rod displacement amount according to said total number of counted edges.

2. The method as claimed in claim 1, wherein said rod stop/nonstop judging step includes:

a first step judging whether the rod is in motion by determining whether a square wave form produced from the signal exists;

a second step judging whether the rod is in motion by determining the number of said correction edges, said second step further judging whether a second of the plurality of magnetic sensors detects said projection edge between said correction edges; and a third step determining direction of said rod movement prior to the rod stopping if said first step and said second step determine the rod has stopped.

3. The method as claimed in claim 1, wherein said first edge occurrence judging step includes:

a first step calculating said first time interval based on an average of previous time intervals;

a second step judging whether the just previous counted edge is one of said projection edges or one of said correction edges; and a third step judging whether said projection edge has occurred within said first time interval.

4. The method as claimed in claim 1, wherein said second time interval is larger than said first time interval.

5. The method as claimed in claim 1, wherein said absolute position establishing step includes:

a first step judging whether at least two consecutive correction edges occur, said first step performing said displacement computing step if said at least two consecutive correction edges do not occur;

a second step judging whether at least two consecutive correction edges are detected by a second of said plurality of magnetic sensors, said second step performing said displacement computing step if said at least two consecutive correction edges are not detected by said second magnetic sensor within a third time interval;

a third step storing an $n^{th}$ reference point if an actual time interval between said projection edges is within said second time interval, said third step ignoring said projection edges and returning to said rod stop/nonstop judging step if said actual time interval is not within said second time interval;

a fourth step judging whether there is a $(n-1)^{th}$ reference point, said third step returning to said rod stop/nonstop judging step if there is no $(n-1)^{th}$ reference point; and a fifth step counting the number of said counted edges occurring between said $(n-1)^{th}$ reference point and said $n^{th}$ reference point, said fifth step storing said absolute position corresponding to said number of counted edges and outputting said absolute position to said display unit, said fifth step returning to said rod stop/nonstop judging step.

6. The method as claimed in claim 1, wherein said absolute position establishing step includes:

a first step judging whether at least two consecutive correction edges occur, said first step performing said displacement computing step and returning to said rod stop/nonstop judging step if said at least two consecutive correction edges do not occur;

a second step judging whether at least two consecutive correction edges are detected by a second of the plurality of magnetic sensors, said second step performing said displacement computing step and returning to said rod stop/nonstop judging step if said at least two consecutive correction edges are not detected by said second magnetic sensor within a third time interval;

a third step storing a pre-set valve as a reference point if an actual time interval between said projection edges is within said second time interval, said third step ignoring said projection edges and returning to said rod stop/nonstop judging step if said actual time interval is not within said second time interval; and a fourth step storing said absolute position corresponding to said number of counted edges and outputting said absolute position to said display unit, said fourth step returning to said rod stop/nonstop judging step.

7. The method as claimed in claim 1, wherein said displacement computing step includes:

a first step adding one (1) to a total number of said counted edges;

a second step calculating the rod displacement according to the number of said counted edges; and a third step storing the rod displacement calculated in said second step at a memory position and outputting the rod displacement to said display unit.

* * * * *